(12) United States Patent
Ozdemir et al.

(10) Patent No.: US 7,334,105 B2
(45) Date of Patent: *Feb. 19, 2008

(54) SYSTEM AND METHOD FOR MANAGING THE MEMORY IN A COMPUTER SYSTEM

(75) Inventors: Kadir Ozdemir, Alameda, CA (US); Shankar Jayaraman, Fremont, CA (US)

(73) Assignee: Wind River Systems, Inc., Alameda, CA (US)

( * ) Notice: Subject to any disclaimer, the term of this patent is extended or adjusted under 35 U.S.C. 154(b) by 535 days.

This patent is subject to a terminal disclaimer.

(21) Appl. No.: 10/840,097

(22) Filed: May 6, 2004

(65) Prior Publication Data

US 2005/0005083 A1    Jan. 6, 2005

Related U.S. Application Data

(63) Continuation of application No. 09/728,168, filed on Dec. 1, 2000, now Pat. No. 6,760,826.

(51) Int. Cl.
  *G06F 12/02*    (2006.01)
  *G06F 13/00*    (2006.01)

(52) U.S. Cl. .................. 711/171; 711/154; 711/170
(58) Field of Classification Search ................ 711/100, 711/111, 154, 170, 171, 172
See application file for complete search history.

(56) References Cited

U.S. PATENT DOCUMENTS

| | | | | |
|---|---|---|---|---|
| 5,058,003 | A * | 10/1991 | White | 711/209 |
| 5,706,461 | A * | 1/1998 | Branstad et al. | 711/203 |
| 5,887,134 | A * | 3/1999 | Ebrahim | 709/200 |
| 6,249,852 | B1 * | 6/2001 | Benayon et al. | 711/170 |

* cited by examiner

*Primary Examiner*—Tuan V. Thai
(74) *Attorney, Agent, or Firm*—Fay Kaplun & Marcin, LLP

(57) ABSTRACT

A method for managing a memory of a computer system to store a data of a first size, comprising the steps of defining chunks of the memory, wherein each chunk is a continuous memory space of a predetermined size. Defining chunk pools for managing the chunks, wherein each chunk pool corresponds to chunks of a particular size and defining unit pools for managing units of the first size, wherein the chunk pool corresponding to the unit pool provides a chunk of the particular size to be separated into the units of the first size, and the data of the first size is stored in the units.

14 Claims, 8 Drawing Sheets

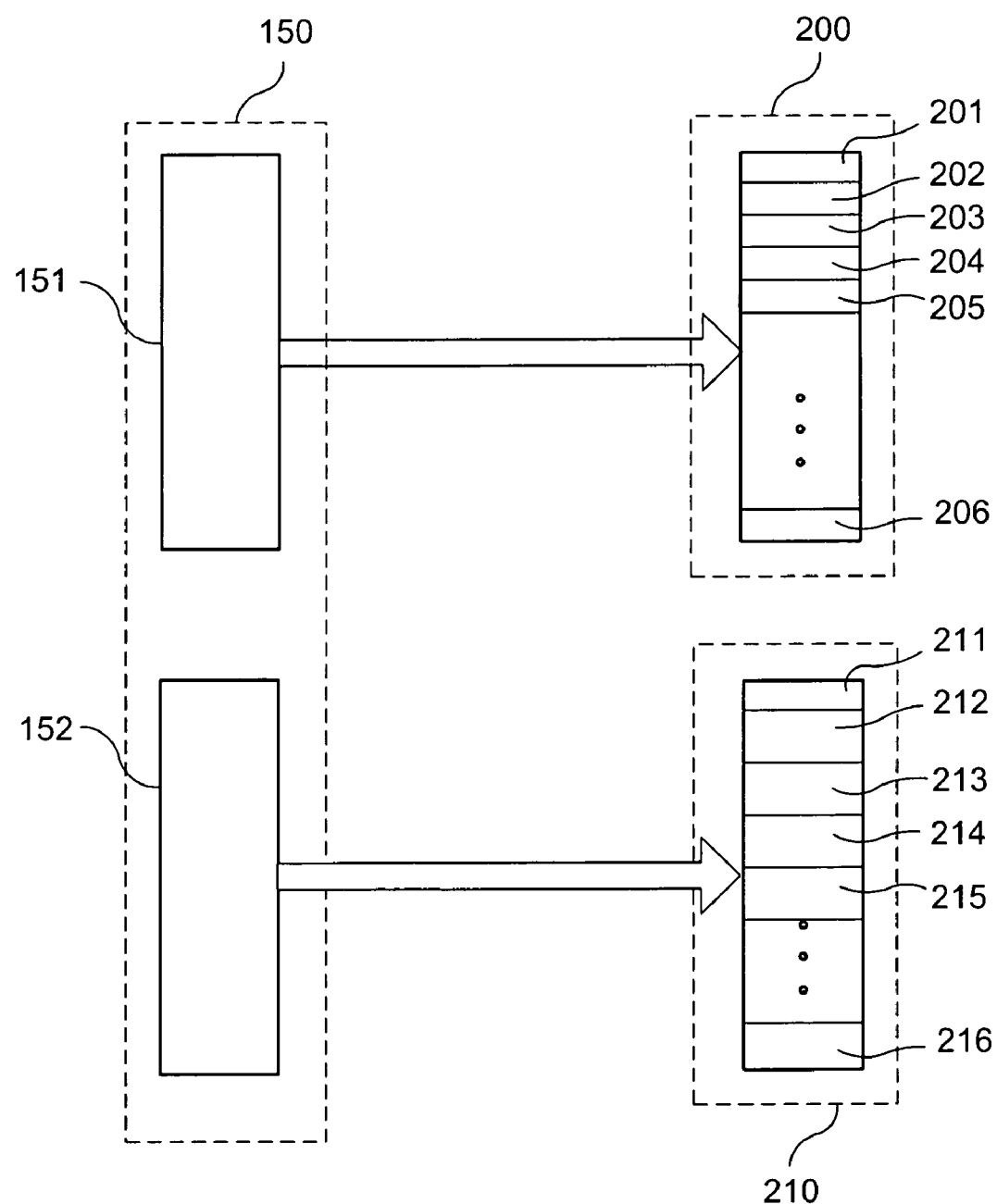
F I G. 4

SYSTEM AND METHOD FOR MANAGING THE MEMORY IN A COMPUTER SYSTEM

This application is a Continuation of prior U.S. patent application Ser. No. 09/728,168 filed Dec. 1, 2000, now U.S. Pat. No. 6,760,826, entitled "System and Method to Store Data in the System Memory of a Computing Device." The application is expressly incorporated herein, in its entirety, by reference.

BACKGROUND INFORMATION

A computer system is comprised of numerous different components, each of which has a particular function in the operation of the computer system. For example, FIG. 1 depicts an exemplary embodiment of personal computer ("PC") 1 which may be a computing device or other microprocessor-based device including processor 10, system memory 15, hard drive 20, disk drive 25, I/O devices 30, a display device 35, keyboard 40, mouse 45 and a connection to communication network 50 (e.g., the Internet). Each of these devices in PC 1 has one or more functions which allow PC 1 to operate in the manner intended by the user. For example, hard drive 20 stores data and files that the user may wish to access while operating PC 1, disk drive 25 may allow the user to load additional data into PC 1, I/O devices 30 may include a video card which allows output from PC 1 to be displayed on CRT display device 35.

System memory 15 may be, for example, Random Access Memory ("RAM") which is a type of memory for storage of data on a temporary basis. In contrast to the memory in hard drive 20, system memory 15 is short term memory which is essentially erased each time PC 1 is powered off. System memory 15 holds temporary instructions and data needed to complete certain tasks. This temporary holding of data allows processor 10 to access instructions and data stored in system memory 15 very quickly. If processor 10 were required to access hard drive 20 or disk drive 25 each time it needed an instruction or data, it would significantly slow down the operation of PC 1. All the software currently running on PC 1 require some portion of system memory 15 for proper operation. For example, the operating system, currently running application programs and networking software may all require some portion of the memory space in system memory 15. Using the example of an application program, when the user of PC 1 enters a command in keyboard 40 or mouse 45 to open a word processing program, this command is carried out by processor 10. Part of executing this command is for data and instructions stored in hard drive 20 for the word processing program to be loaded into system memory 15 which can provide data and instructions to processor 10 more quickly than hard drive 20 as the user continues to enter commands for the word processing program to execute.

When system memory 15 is RAM, the memory is randomly allocated to the applications in small chunks as needed. The chunks allocated to individual software programs do not have to be located continuously within system memory 15. Processor 10 assigns each chunk a particular address and, in that way, processor 10 may randomly choose such addresses from a pool of available addresses. Since processor 10 continually assigns random addresses, the data for each individual program becomes highly fragmented throughout the memory space in system memory 15. This fragmentation requires processor 10 to access multiple memory areas of system memory 15 for an individual application. This multiple accessing of system memory 15 slows down program operation and leads to inefficiencies in the operation of PC 1.

Additionally, when processor 10 assigns addresses to the memory chunks of system memory 15, these chunks are of a defined size, for example, 8 bytes. Every time a particular address is accessed and used to store data, the entire chunk is allocated without regard to the actual size of the data. For example, if processor 10 is loading data having a size of 4 bytes into a chunk of system memory 15 which is 8 bytes, the entire 8 bytes is not available even though only 4 of the 8 bytes are actually being used. As more data is stored in the temporary memory of system memory 15, there may be a large amount of memory allocated to data that is not actually being used, but yet it cannot be allocated for other data because processor 10 detects that the address for the space is in use. Similarly, if processor 10 is loading data that is larger than the pre-assigned defined size of the chunks, chunks must be coalesced into a chunk large enough to handle the information.

SUMMARY OF THE INVENTION

A method for managing a memory of a computer system to store data of a particular size by defining chunks of the memory, wherein each chunk is a continuous memory space of a predetermined size. Defining chunk pools for managing the chunks, wherein each chunk pool corresponds to chunks of a particular size and defining unit pools for managing units of the first size, wherein the chunk pool corresponding to the unit pool provides a chunk of the particular size to be separated into the units of the first size, and the data of the first size is stored in the units.

BRIEF DESCRIPTION OF DRAWINGS

FIG. 4 shows an exemplary relationship between units, unit pools, chunks and chunk pools according to the present invention.

DETAILED DESCRIPTION

Figure 1:
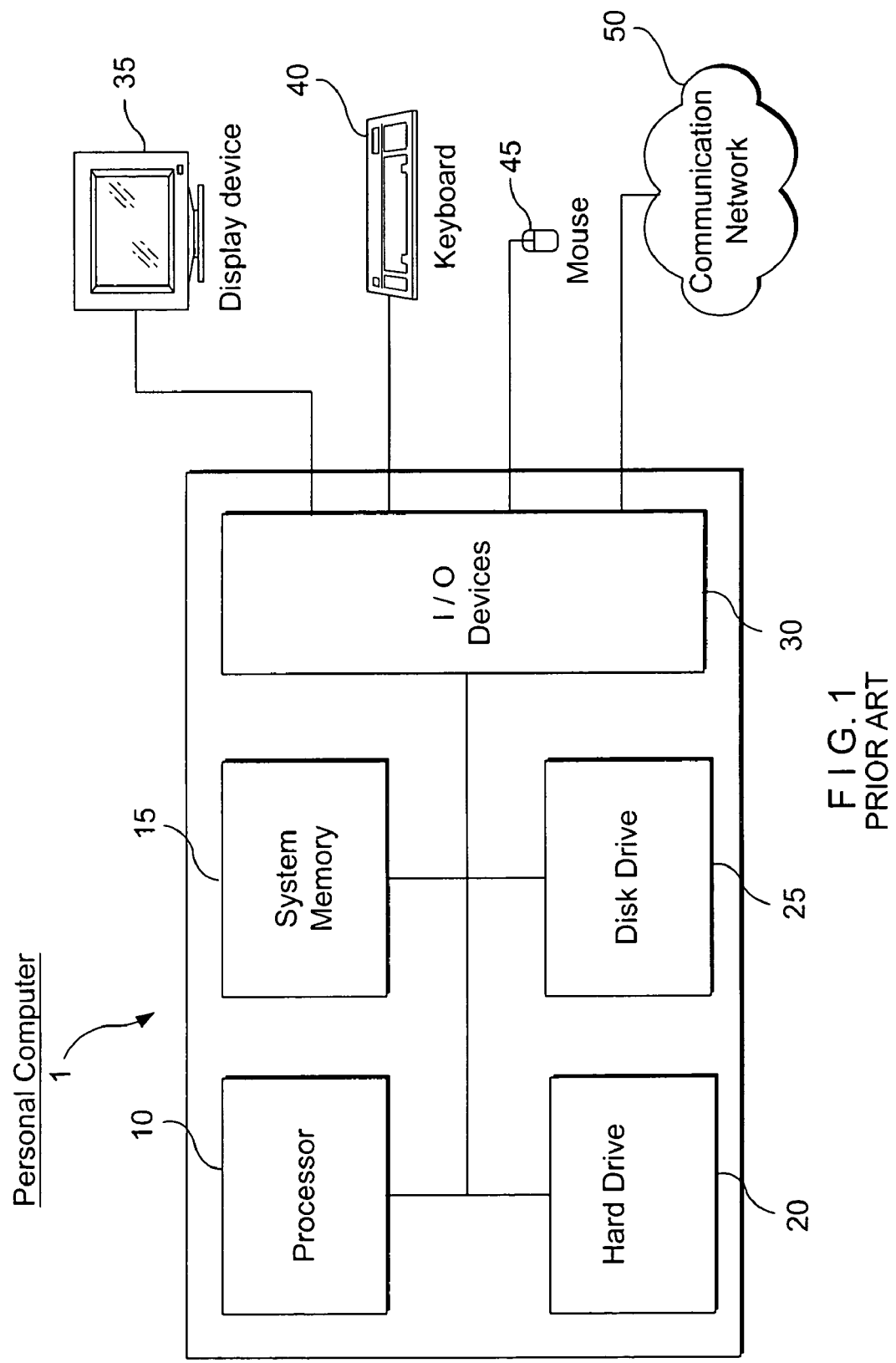
FIG. 1 depicts a conventional computing device.

The present invention may be further understood with reference to the following description and the appended drawings, wherein like elements are provided with the same reference numerals. Throughout this specification the term system memory will be used, and it should be understood that this term may refer to any type of RAM, for example, Static RAM ("SRAM"), Dynamic RAM ("DRAM"), Synchronous DRAM ("SDRAM"), Enhanced DRAM ("EDRAM"), etc, but also to any type of temporary memory device that stores data and/or instructions for use by a computing device. Additionally, throughout this specification, the system memory will be discussed as being accessed and allocated by a processor or microprocessor and it should be understood that the present invention may be implemented in any computing and/or electronic device where processors and/or microprocessors perform such functions, for example, PCs, servers, internet devices, embedded devices, or any computing device.

Figure 2:
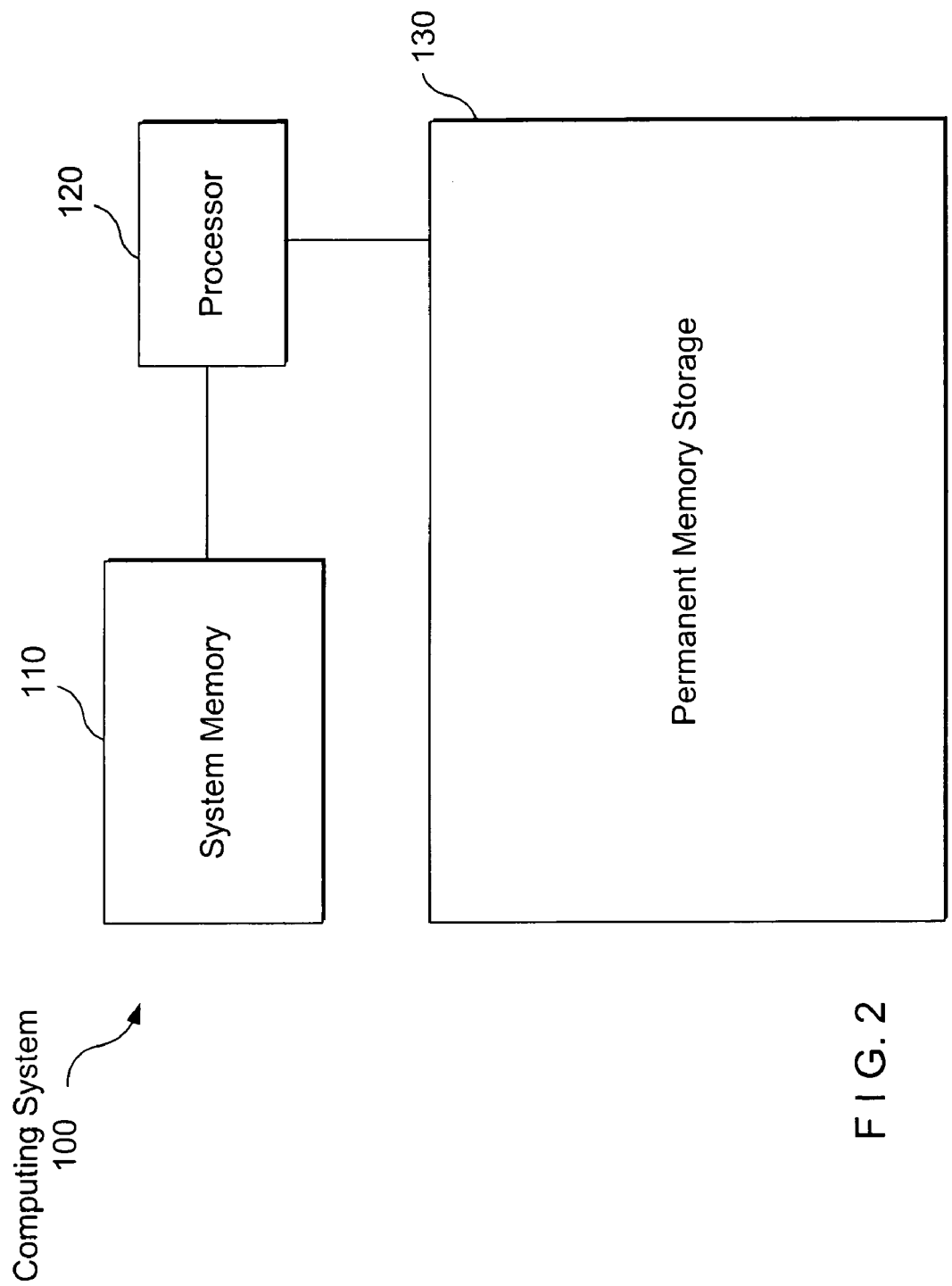
FIG. 2 shows an exemplary computing system on which the present invention may be implemented.

Referring to FIG. 2 there is illustrated an exemplary computing system 100 on which the present invention may be implemented. Exemplary computing system 100 may include, among other things, system memory 110, processor 120 and permanent memory storage 130. As described above, system memory 110 may be RAM or any other type of temporary memory device that stores data and/or instructions. Permanent memory storage 130 may be, for example, a hard drive. If it were considered that computing system 100 was a typical PC and system memory 110 was the RAM component and permanent memory storage 130 a hard drive, there would normally be 64 or 128 Mbytes of system memory 110 and 2-20 Gbytes of memory in permanent memory storage 130. Of course, the goal of PC manufacturers is to continually add additional RAM and hard drive space in PCs and devices such as servers may have significantly more system memory, while embedded devices may have less system memory depending on the particular application. The present invention is not limited by the size of the system memory, it may be more or less than the exemplary values discussed above. In a computing device, processor 120 would allocate system memory 110 as needed to run the operating system and any additional software, for example, application programs and networking software. This allocation may be accomplished by, for example, copying data needed to run the software from the permanent memory of permanent memory storage 130 to the temporary memory of system memory 110. When the data is no longer needed in system memory 110 to run the particular software, the data is erased and the memory space it occupied becomes available for processor 120 to randomly load new data into system memory 110. Those skilled in the art will understand that the data may not actually be erased it may merely be flagged so it can be overwritten or a pointer may be set allowing the data to be overwritten, however, for the remainder of this specification erasing the data will mean any of the common methods of signaling there is free space in system memory to allow new data to replace data that is no longer required by the system.

In an exemplary embodiment of the present invention, system memory 110 is not treated as one big chunk of memory space (e.g., 128 Mbytes) to be allocated for data at random, but rather is divided for more efficient use by processor 120. The division of system memory 110 is based on the principle that data of the same size will be stored in a continuous area of system memory 110. This data will not become fragmented because as data is erased from system memory 110, any new data of the same size may be written into the memory space vacated by the erased data.

Figure 3:
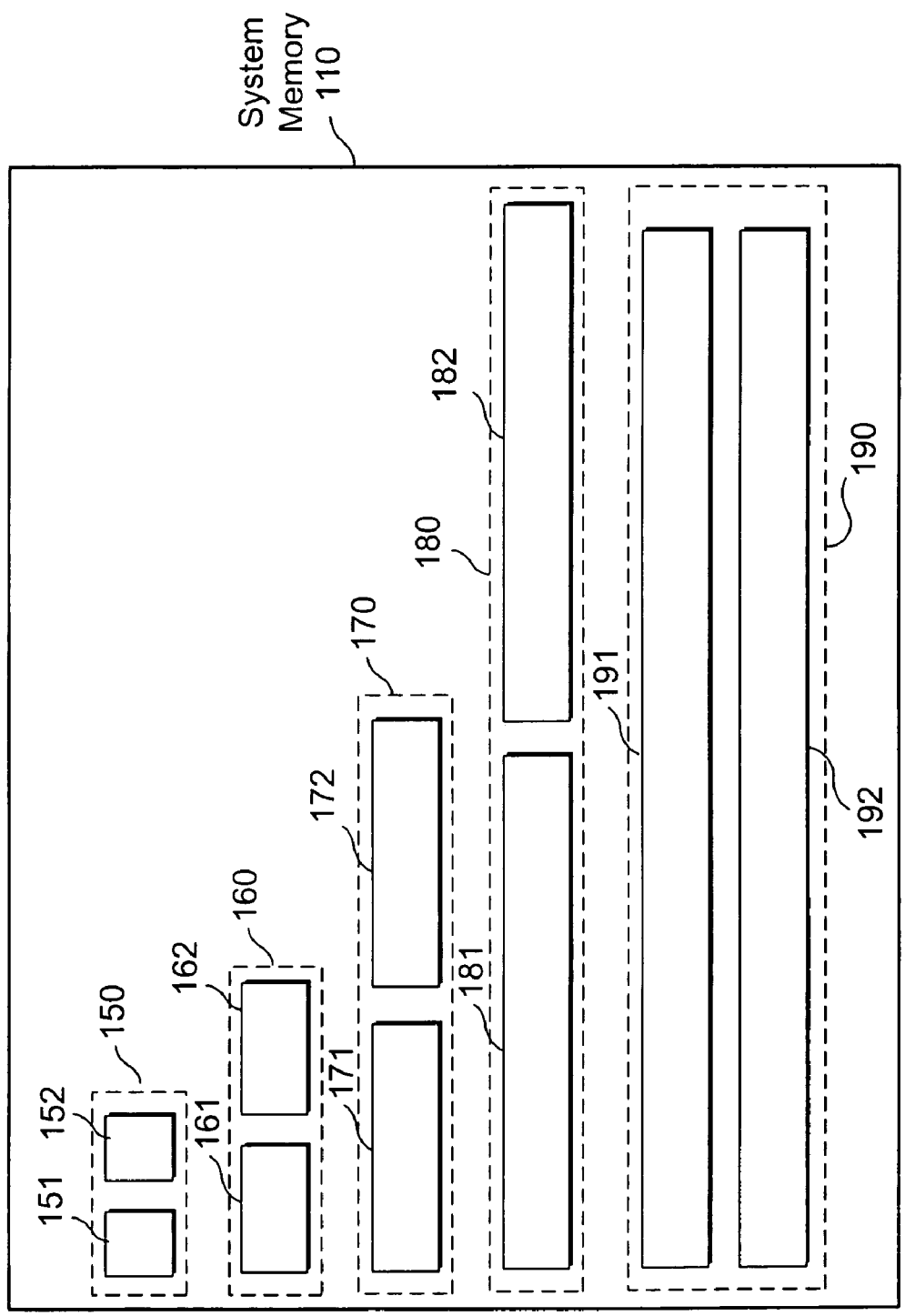
FIG. 3 shows an exemplary division of system memory into various size chunks that are grouped into chunk pools according to the present invention.

FIG. 3 shows an exemplary division of system memory 110 into various size chunks that are grouped into chunk pools according to the present invention. A chunk is a continuous physical memory space of a specified size. These are the continuous memory areas where data of the same size may be stored. Chunks 151-152 may have a size of, for example, 512 bytes each and belong to chunk pool 150, chunks 161-162 are twice as large at 1,024 bytes each and belong to chunk pool 160, and likewise, in this exemplary embodiment each of the successive chunks in the remaining chunk pools are twice as large as the chunks in the previous chunk pools. Thus, chunks 171-172 are 2,048 bytes, chunks 181-182 are 4,096 bytes and chunks 191-192 are 8,192 bytes. All chunks are memory spaces within system memory 110 and may be located anywhere throughout system memory 110; the only requirement is that the bytes in a particular chunk are continuous. For example, as described above, system memory 110 may have an overall size of 128 Mbytes which could be represented as $2^{27}$ consecutive storage areas having 1 byte of storage. Therefore, chunk 151 having a size of 512 bytes may occupy any 512 bytes within the 128 Mbytes, but the 512 bytes occupied by chunk 151 should be continuous. Thus, chunk 151 may occupy byte locations 1-512 in system memory 110 or, just as likely, it may occupy locations 10,001-10,512 or any other continuous memory area of 512 bytes. Chunk pools 150, 160, 170, 180 and 190 manage the memory chunks of a certain fixed predetermined size. For example, chunk pool 150 manages chunks 151-152 which have a size of 512 bytes. If any additional chunks of 512 bytes are created, such a new chunk would be managed by chunk pool 150 because it has been defined as the manager of 512 byte chunks. The defining of chunks and chunk pools will be described in greater detail below.

The number of chunks and chunk pools and the sizes of each described with reference to FIG. 3 are only exemplary and any number of chunks and/or chunk pools of any size may be selected in implementing the present invention. Additionally, there is no requirement that each of the chunks be one half the size of the next largest chunk or that the larger chunks be some factor of the smaller chunks. However, as will be described in greater detail below, there may be some embodiments of the present invention which are more easily implemented when the larger chunks are some factor of the smaller chunks as shown in FIG. 3. It should also be noted that the chunks shown in FIG. 3 do not need to exist at the time system 100 is started. The chunks may be dynamically created as they are needed during runtime. This dynamic creation of chunks will be described in more detail below.

In addition to chunks and chunk pools, an exemplary embodiment of the present invention also includes units and unit pools. Units are the continuous portion of memory which are the size of the data that each unit pool will store. As described above, data of the same size will be stored in the same continuos areas of system memory 110. Unit pools manage units of a certain fixed predetermined size. Each unit pool will only manage units of the same size. FIG. 4 shows an exemplary relationship between units, unit pools, chunks and chunk pools according to the present invention. FIG. 4 shows chunk pool 150 which manages chunks having sizes of 512 bytes. At the present moment there are two 512 byte chunks 151-152 being managed by chunk pool 150. There are also two defined unit pools 200 and 210. Unit pool 200 may be assigned to manage units having a size of four bytes. Thus, the units of unit pool 200 may be assigned as the storage location for data with a size of four bytes. Unit pool 210 may be assigned to manage units having a size of eight bytes. Thus, the units of unit pool 210 may be assigned as the storage location for data with a size of eight bytes. However, unit pools 200 and 210 cannot have any actual units until there is a physical storage location to store the associated data. Therefore, a unit pools is associated with a chunk pool where the unit pool may assume control over one or more of the chunks controlled by the chunk pool. Once the unit pool assumes control of a chunk, it may separate the chunk into a number of units corresponding to the unit size for which the particular unit pool is responsible. Then, the unit pool has actual physical storage locations for the data.

Referring to FIG. 4, unit pools 200 and 210 are associated with chunk pool 150 which is responsible for the management of 512 byte chunks, e.g., chunks 151 and 152. A single chunk pool may be associated with multiple unit pools. When there is a request to store a four byte set of data, this request goes to unit pool 200 because it is responsible for the management of four byte data sets. When the first request is received by unit pool 200, it must make a request to its associated chunk pool 150 to receive control over a chunk, for example, chunk 151 so that it may have a physical storage location for the four byte data set. In this example, chunk pool 150 has relinquished control over chunk 151 to unit pool 200 which separates chunk 151 into four byte units 201-206. It may be calculated to show that there may be 128 units of four bytes within chunk 151. The four bytes of data may then be directed to one of units 201-206 of chunk 151. For example, a first four byte data set may be stored in unit 201, while a second four byte data set may be stored in unit 202 and likewise until all of units 201-206 are filled with four byte data sets. In this manner all the stored four byte data sets may be stored in the same continuous memory area (i.e., the memory area of chunk 151).

When all units 201-206 of chunk 151 are full, there maybe another chunk allocated for the storage of four byte data sets. The process for allocating a new chunk from chunk pool 150, when it does not have any immediately available will be described in greater detail below. However, this new allocation will only take place when chunk 151 is completely full. For example, if the first four byte data set stored in unit 201, is no longer needed by the software program, this data is erased from unit 201 which then becomes available for use by another four byte data set. In this case, when the software program needs to store another four byte data set, unit 201 is now available to store this new four byte data set.

Similarly, unit pool 210 is associated with chunk pool 150. When there is a request to store an eight byte set of data, this request goes to unit pool 210 because it is responsible for the management of eight byte data sets. When the first request is received by unit pool 210, it must make a request to its associated chunk pool 150 to receive control over a chunk, for example, chunk 152 so that it may have a physical storage location for the eight byte data set. In this example, chunk pool 150 has relinquished control over chunk 152 to unit pool 210 which separates chunk 152 into eight byte units 211-216. It may be calculated to show that there may be 64 units of eight bytes within chunk 152. The eight bytes of data may then be directed to one of units 211-216 of chunk 152. Once again, in this manner all the stored eight byte data sets may be stored in the same continuous memory area (i.e., the memory area of chunk 152). The association of unit pools and chunk pools in FIG. 4 is only exemplary and the unit pools may be associated in any manner among the chunk pools. For example, the system designer may be aware that there will be a large quantity of eight byte data sets that will be stored, while there may be a very limited number of sixteen byte data sets that will need to be stored during the operation of the system. In this case, the system designer may associate a unit pool responsible for eight byte data sets to a chunk pool responsible for chunks having a size of 4,096 bytes (e.g., chunk pool 180 and chunks 181-182). In this case, the unit pool may have 512 units of eight bytes available for the storage of eight byte data sets. In contrast, the system designer may associate a unit pool responsible for sixteen byte data sets with a chunk pool responsible for chunks having a size of 1,024 bytes (e.g., chunk pool 160 and chunks 161-162). In this case, the unit pool may have only 64 units of sixteen bytes available for the storage of sixteen byte data sets.

Figure 5:
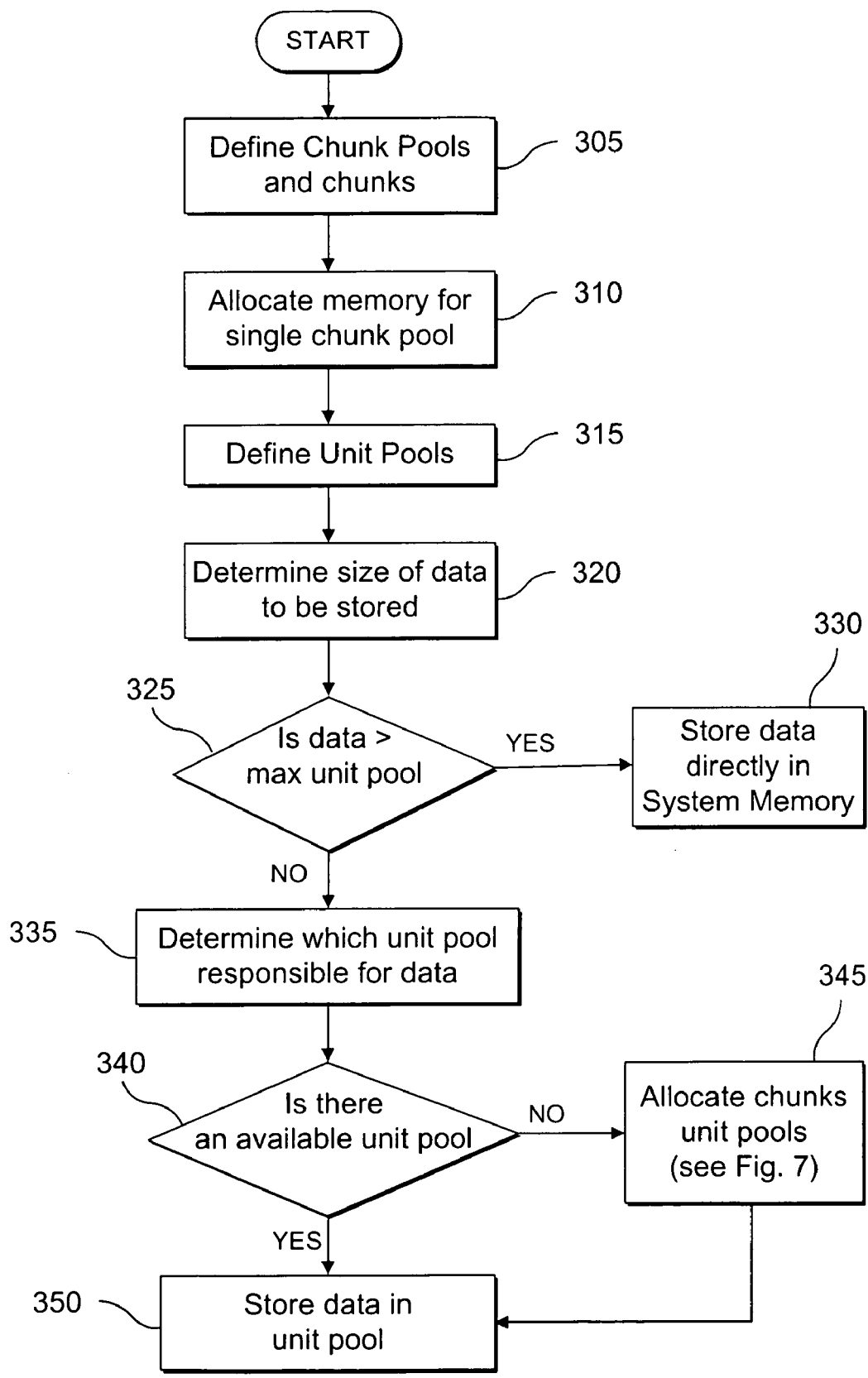
FIG. 5 shows an exemplary process flow for implementing a memory manager according to the present invention.

FIG. 5 shows an exemplary process flow for implementing a memory manager according to the present invention. As described above with reference to FIG. 2, during the operation of system 100, processor 120 may desire to move data from permanent memory storage device 130 to system memory 110. The exemplary memory manager process described with respect to FIG. 5 is directed to the orderly storage of this data in the system memory. The exemplary process of FIG. 5 may be carried out by a set of instructions that are stored in, for example, permanent memory storage device 130 or system memory 110 and executed by, for example, processor 120. Those skilled in the art will understand that system 100 may include multiple other devices than those depicted in FIG. 2, and the memory manager function may be stored and/or executed by any of these other devices. Starting with step 305, the chunk pools and chunks are defined, for example, the chunk pools and chunks described with reference to FIG. 3. It is not necessary to allocate the system memory space for the chunks, just to define the various sizes of the chunks and the chunk pools which the memory manager will support. The allocation of the memory space for the defined chunks may take place at a later time during system operation when the particular chunk is needed. It may also be possible to allocate the memory space for the chunks when the chunks are defined in step 305. In this exemplary embodiment of the present invention, memory space from system memory will be allocated for one chunk in step 310. The one chunk that will have system memory space allocated will be one of the chunks that is the largest chunk size defined in step 305. For example, if in step 305, chunks are defined that have the sizes of the chunks described with reference to FIG. 3, that is chunks of 512 bytes, 1,024 bytes, 2,048 bytes, 4,096 bytes and 8,192 bytes, in this example, in step 310, one chunk of 8,192 bytes in chunk pool 190, the largest defined size will be allocated from system memory. The reason for initially allocating this one chunk is to prevent a back and forth or "ping-pong" effect between the chunks and system memory.

The process then continues to step 315 where the unit pools are defined. As described above, unit pools manage equal size units where the data of the particular size associated with the unit pool will be stored. For example, the unit pools defined in step 315 may be similar to those described with respect to FIG. 4. Included in the definition of unit pools in step 315 is not only the size of the units which the unit pool will manage, but also with which chunk pool the unit pool is associated. When step 315 is complete, system operation may commence because all the necessary definitions for the operation of the exemplary embodiment of a memory manager have been made. As described above, it is not necessary for the allocation of step 310 to take place prior to system operation, but it may take place during system operation, as will be described in greater detail below.

The remaining steps in the exemplary process of FIG. 5 are steps that may be accomplished during system operation, e.g., when processor 120 desires to store data in system memory 110. In step 320 the size of the data to be stored is identified. Another manner of describing this step is to determine the data size requested by the application. Once the size of the data is identified in step 320, it is next determined whether that size is greater than the largest unit managed in a defined unit pool. If the largest unit defined in step 315 was 2,048 bytes and the size of the data was larger than 2,048 bytes, for example, 4,096 bytes, then there are no defined units that are large enough to store the data of that size. In this case, the process continues to step 330 where the data bypasses any further processing by the memory manager and is stored directly in system memory. This storage operation of step 330 may be by any of the known techniques of data storage in system memory. In this manner, the memory manager of the present invention may be implemented in conjunction with these present methods for storing data in system memory. It should be noted that the comparison in step 325 is between the size of the data to be stored and the size of the largest defined unit, not the largest defined chunk. Thus, there may be a chunk that is larger than the size of data to be stored, but not a unit. Carrying through with the previous example, the size of the data to be stored may be 4,096 bytes, the largest unit may be 2,048 bytes, and the largest chunk may be 8,192 bytes. Even though there is a chunk larger than the data to be stored, the memory manager will still proceed to step 330 because the comparison in step 325 is between the size of the data to be stored and the size of the largest defined unit. It should also be noted that when discussing the sizes of the units it may be interchangeable to use the term unit pool also, because all the units in a particular unit pool will have the same size. Thus, for example, the largest unit may be 2,048 bytes, but so will the largest unit pool be 2,048 bytes because all the 2,048 byte units are in the 2,048 unit pool.

The question may arise that if there is data to be stored in system memory that is 4,096 bytes, then why in steps 305 and steps 315 were there not appropriate chunks and units defined to handle the storage of data of that size. In defining the chunks and units in steps 305 and 315, the system designer, in very few cases, will ever know the maximum size data which will be stored in the system memory. However, the system designer may know, with a fair degree of accuracy, a maximum unit size that may encompass 75-85% of the data that will be stored in the system memory (i.e., 75-85% of the pieces of data will have a size less than or equal to the maximum unit size). This maximum size unit which will encompass this range of the stored data is system dependent and may depend on a number of factors, such as, type and number of applications, network connections and protocols, etc. If the system designer elects to define units and chunks that are excessively large in order to ensure that every possible piece of data to be stored in system memory is accommodated, it may, in fact, reduce the effectiveness of this exemplary memory manager process. For example, in step 310 system memory equal to the size of the largest chunk has already been allocated. In most instances, the largest unit pools will be associated with the largest chunk pools. Thus, excessively large maximum unit pools may result in the allocation of an excessively large portion of the system memory. This large portion of system memory will then be unavailable for other uses. Referring back to FIG. 3, it should be noted that the chunks referred to are only a small portion of the overall system memory 110. If, for example, system memory 110 had 128 Mbytes of memory, the chunks described in FIG. 3 only account for 31,744 bytes of this overall system memory. System memory 110 may have large portions of its memory space allocated for other purposes, for example, operating system requirements, that are necessary for efficient operation of the system. System memory 110 is not confined to storing the data discussed with reference to the exemplary embodiment of the present invention, but may also be utilized to store data for a variety of other purposes. Thus, the exemplary embodiment of the present invention may be used to manage anywhere from a very large portion to a very small portion of system memory 110.

However, in either case, the exemplary embodiment of the present invention should operate without infringing upon the operation of these other functions of system memory 110. Selecting a maximum unit pool that accommodates 75-85% of the expected data and using other known techniques for storing the remaining 15-25% of the data generally accomplishes the balancing of these different functions of system memory 110. Those skilled in the art will understand that the 75-85% is not a requirement of the present invention because there may be circumstances where more, less, or substantially less of the expected data is covered by the maximum unit pool size. For example, a system designer may be having particular difficulty with fragmentation of very small pieces of data, (e.g., 4, 8 and 16 byte sized data). In this case, the system designer may implement the exemplary embodiment of the present invention with a maximum unit pool size of 16 bytes which may be, for example, 10% or less of the expected data because conventional techniques of system memory storage are adequate for the remainder of the data. Likewise, there may be other instances where operating speed is critical and little or no fragmentation of system memory 110 can be tolerated. In these instances, the maximum unit pool size may be defined so that it encompasses 100% or nearly 100% of the expected data.

Referring back to FIG. 5 and continuing with the exemplary process, if in step 325 the data is not larger than the maximum unit pool size, it can be stored in a unit pool and the process continues to step 335 to determine which unit pool is responsible for the data. For example, referring back to FIG. 4, if the data were a four byte set, then unit pool 200 would be responsible for the data. Once the proper unit pool has been identified in step 335, the process continues to step 340 to determine whether there is an available unit in the identified unit pool. As described previously, when the system begins operation, memory space is only allocated for a single chunk in step 310. Therefore, it is highly likely that there will not be any available units for the first several pieces of data because the chunks have not even been allocated to the chunk pools and therefore, the unit pools have not yet had a chance to request a chunk from the associated chunk pools. Thus, it is likely that for the first several pieces of data the process will continue to step 345 where the chunks will be allocated. This may be a fairly detailed process and an exemplary process for accomplishing this allocation of chunks will be described in more detail with reference to FIG. 7. However, for purposes of the present exemplary process, it may be considered that the desired result is accomplished by step 345. The process then continues to step 350 after step 345, or if in step 340 it is determined that there is an available unit for the data. In step 350, the data is stored to the appropriate unit and is available for future retrieval and use by, for example, processor 120 of FIG. 2.

Figure 6:
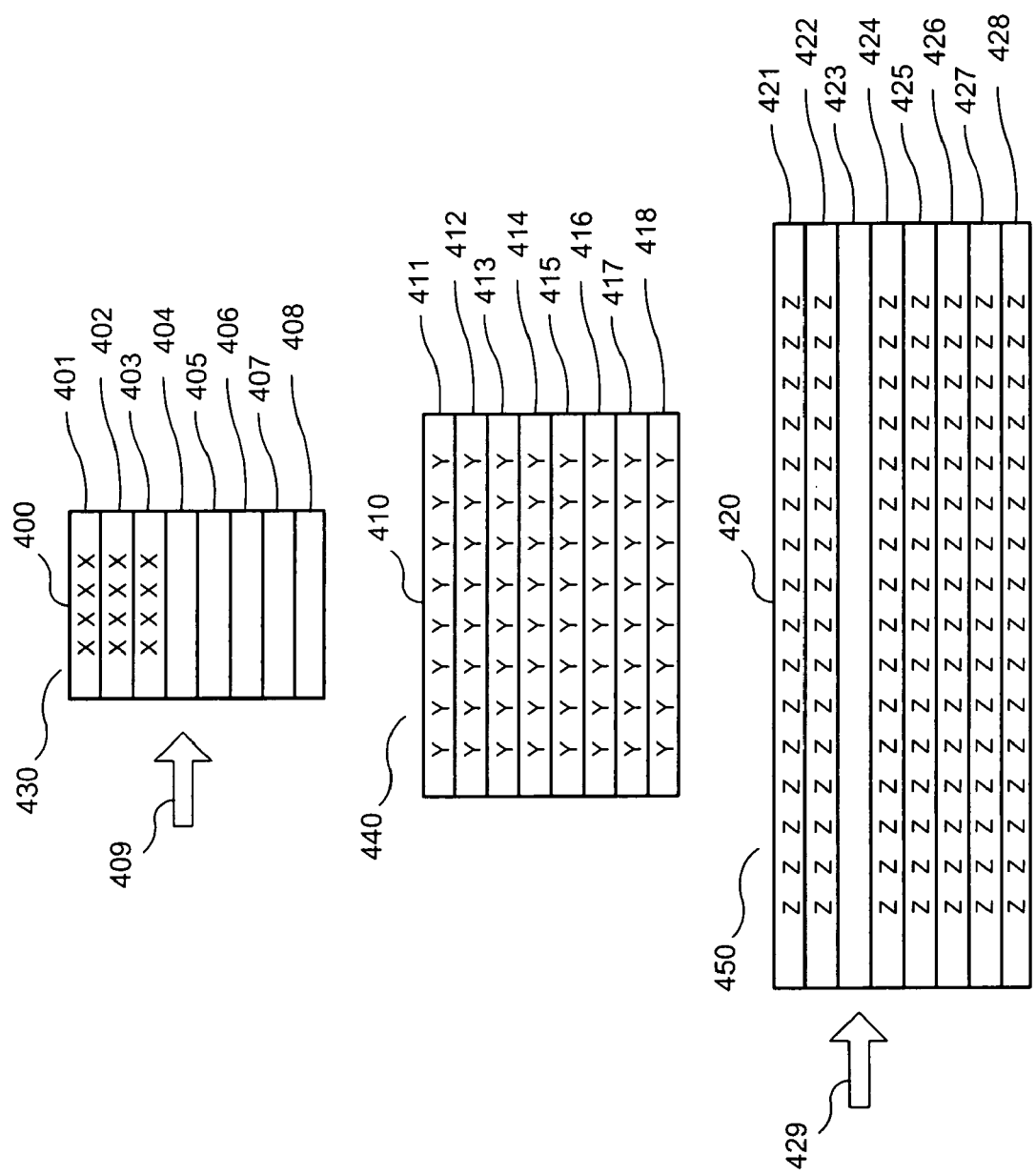
FIG. 6 shows exemplary chunk pools and associated unit pools storing data as described in the exemplary process of FIG. 5 according to the present invention.

FIG. 6 shows exemplary chunks 400, 410 and 420 under the control of unit pools 430, 440 and 450 and associated units storing data as described in step 350 of the exemplary process of FIG. 5. Each of chunks 400, 410 and 420 have been previously defined in terms of size and terms of the size of the units with which they are associated as in, for example, steps 305 and 315 of FIG. 5, respectively. Chunk 400 is an exemplary 32 byte chunk which is associated with 4 byte units 401-408. Chunk 410 is an exemplary 64 byte chunk which is associated with 8 byte units 411-418. Chunk 420 is an exemplary 128 byte chunk which is associated with 16 byte units 421-428. Four byte units 401-403 of chunk 400 already have data stored in them, thus pointer 409 is directing that the next piece of data that is four bytes should be stored in unit 404. For example, referring back to FIG. 5, if in step 320 it is determined that the data size is four bytes, the process continues to step 325 which determines that four bytes is not greater than the maximum unit pool size. The process continues to step 335 which determines that unit pool 430 is responsible for four byte data sets. In step 340 it is determined that there is an available unit of four bytes in chunk 400 of unit pool 430 by locating pointer 409 which is pointing at vacant four byte unit 404. The process then goes to step 350 which stores the current four byte data into unit 404 and pointer 409 advances to unit 405 indicating that the next piece of four byte data should be stored in unit 405.

As described above, each chunk is a continuous memory area in the system memory 110. Thus, 32 byte chunk 400 is allocated 32 continuous bytes of system memory 110 and each of the units 401-408 associated with chunk 400 are continuous within chunk 400. For example, unit 401 may occupy bytes 1-4 of chunk 400, unit 402 may occupy bytes 5-8 of chunk 400, and so on, until all 32 continuous bytes are accounted for by units. Therefore, when data is stored in a particular unit the pointer information is given to processor 120 and when processor 120 wants to retrieve the data, processor 120 only needs to refer to the pointer information, without any additional information. Processor 120 does not need to know the size of the data because the mere fact that the pointer information is directing processor 120 to a four byte unit pool indicates that the data is four bytes. Additionally, there is no need to set a bit in the data that signifies that it is in the last byte of the data because processor 120 will only take a single unit at a time. For example, if processor 120 wanted to retrieve the four byte instruction stored in unit 402, the pointer to unit 402 would be stored by processor 120 when the data was stored in unit 402. The pointer information would indicate to processor 120 that unit 402 was a four byte unit starting at a particular byte in system memory, e.g., the fifth byte of chunk 400. Processor 120 then accesses this location and retrieves that byte and the following three bytes to gain access to the entire instruction stored in unit 402. If the data was not stored continuously, then a four byte piece of data may require four separate pointers to various physical locations in system memory including an indication of how to reassemble the bytes.

Continuing with FIG. 6, it can be seen that all of units 411-418 of chunk 410 have been filled with eight byte data. Therefore, there is no pointer pointing to any of units 411-418 because they are not available to accept data. Once again, referring back to FIG. 5, and considering that it is determined that the piece of data is eight bytes in step 320 and that there are defined unit pools capable of storing data of this size in step 325, in step 335 it is determined that unit pool 440 is responsible for eight byte data sets. Proceeding to step 340, if chunk 410 is the only current chunk that has memory space allocated for eight byte data, then the process would go to step 345 because there are no currently available units to accommodate data with the size of eight bytes, indicated by the lack of a pointer to an empty unit in chunk 410. Units 421, 422 and 424-428 of chunk 420 are filled with sixteen byte data. However, unit 423 is vacant and pointer 429 is indicating that the next piece of sixteen bit data should be stored in unit 423. The vacancy in unit 423 may be caused by processor 120 erasing data from this unit as a result of, for example, the closing of a network connection or an application program. Once a unit is vacated, it immediately becomes available for another piece of data of the same size. Additionally, all the units of a chunk pool should be filled before allocating memory space for another chunk pool having the same size unit pools. If a first chunk of a unit pool is filled and a second chunk becomes part of the same unit pool, and subsequently, a unit of the first chunk is erased, the pointer will continue to fill the second chunk to avoid the "ping-pong" effect between the first and second chunks. However, when the second chunk is filled the pointer will go back to the first chunk, rather than allocating a new chunk to the unit pool.

Figure 7:
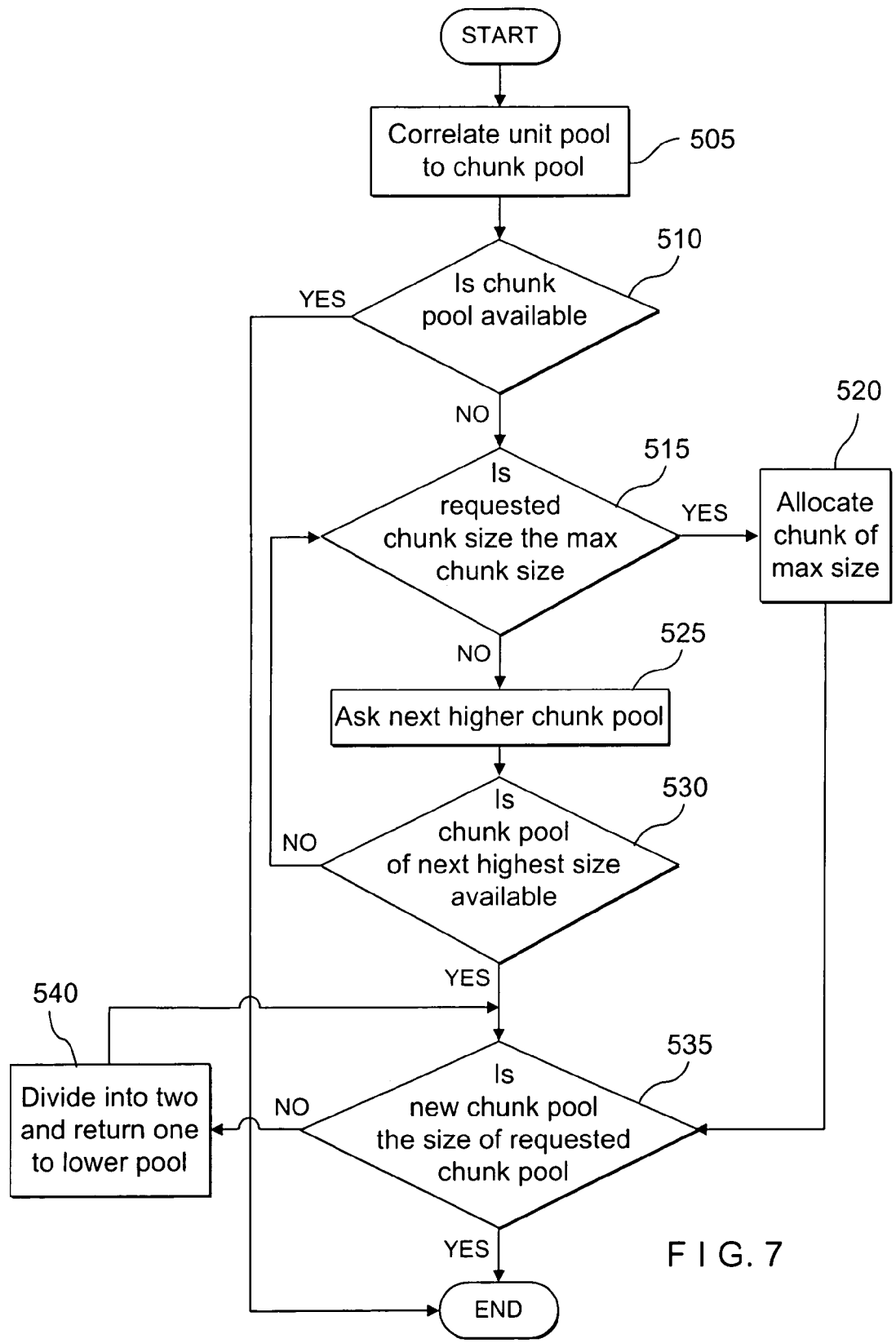
FIG. 7 shows an exemplary process flow for allocating system memory space to chunks according to the present invention.

FIG. 7 shows an exemplary process flow for allocating system memory space to chunks according to the present invention. If there are no available units in the appropriate unit pool for the data to be stored, and the unit pool requests a chunk from the chunk pool associated with the unit pool. In step 505 a correlation between the required unit pool size and the associated chunk pool size occurs. The process then continues to step 510 to determine whether the requested chunk is available. If the chunk is available from the associated chunk pool, then control of the chunk is turned over to the unit pool so that the data may be stored in the chunk and the process is complete. If, in step 510, the chunk is not available from the associated chunk pool, the process continues to step 515 to determine if the requested chunk is the maximum chunk size. If, in step 515, the requested chunk size is the maximum chunk size the process continues to step 520 where there is an allocation of a chunk of the maximum defined size from system memory. For example, referring back to FIG. 3, if the requested chunk pool was the size of chunks 191-192 (8,192 bytes), the process would go to step 520 and allocate another 8,192 byte chunk from system memory. If, in step 515, the requested chunk size is not the maximum chunk pool size the process continues to step 525 where the request moves from the current chunk pool to the next highest chunk pool. The process then continues to step 530 to determine whether there is an existing chunk of the next higher size available. Again referring back to FIG. 3, if the requested chunk was the size of chunks 161-162 (1,024 bytes), step 530 would determine whether there were any chunks of the size of chunks 171-172 (2,048 bytes) available. In step 530, existing chunks means those chunks that already have system memory space allocated to them, not merely that the chunks have been defined. Also, in determining the availability of the next higher size chunk, this exemplary process considers existing chunks to be available if they are still under the control of the chunk pool and have not been relinquished to any unit pools.

In step 530, if it is determined that there are no available chunks of the next higher size, the process loops back to step 515 to determine if the next higher size chunk pool is the maximum chunk pool size. If it is, the process continues to step 520 where there is an allocation of a chunk of the maximum defined size from system memory space. If it is not, the process, once again, proceeds to step 525 to ask the next highest chunk pool and continues to step 530 to determine whether there is an available existing chunk of the second next higher size. Again referring back to FIG. 3 and the example started above with reference to step 530, if the originally requested chunk was the size of chunks 161-162 (1,024 bytes), step 530 in the first instance would determine whether there were any chunks of the size of chunks 171-172 (2,048 bytes) available and if not, in the second instance would determine whether there were any chunks of the second next higher size of chunks 181-182 (4,096 bytes)

available. Thus, it should be seen that steps 515, 525 and 530 form a loop that will not be exited until either a chunk of the maximum defined size is allocated in step 525 or there is some existing chunk available.

If, in step 530, an existing higher size chunk is available, the process continues to step 535 to determine whether the chunk of the maximum size (step 520) or available chunk (step 530) are the size of the originally requested chunk that was determined in correlation step 505. If not, the process continues to step 540 where the chunk is split creating two new chunks. This split does not need to be equal, however, those skilled in the art will recognize that having chunks that are equally divisible factors of each other, for example, the sizes of the chunks described with reference to FIG. 3, lends to an easier manner of splitting the chunks into multiple smaller chunks and returns one of the smaller chunks to the lower chunk pool. The process then loops back to step 535 to determine if the split chunk is of the size of the originally requested chunk. The process continues to loop between steps 535 and 540 until a new chunk pool having the size of the originally requested chunk pool determined in correlation step 505 is created. The process then ends because since the chunk pool has been created, the unit pool of the desired size has been created and the data correlating to the size of the unit pool may be stored as described with reference to FIGS. 5-6.

Figure 8:
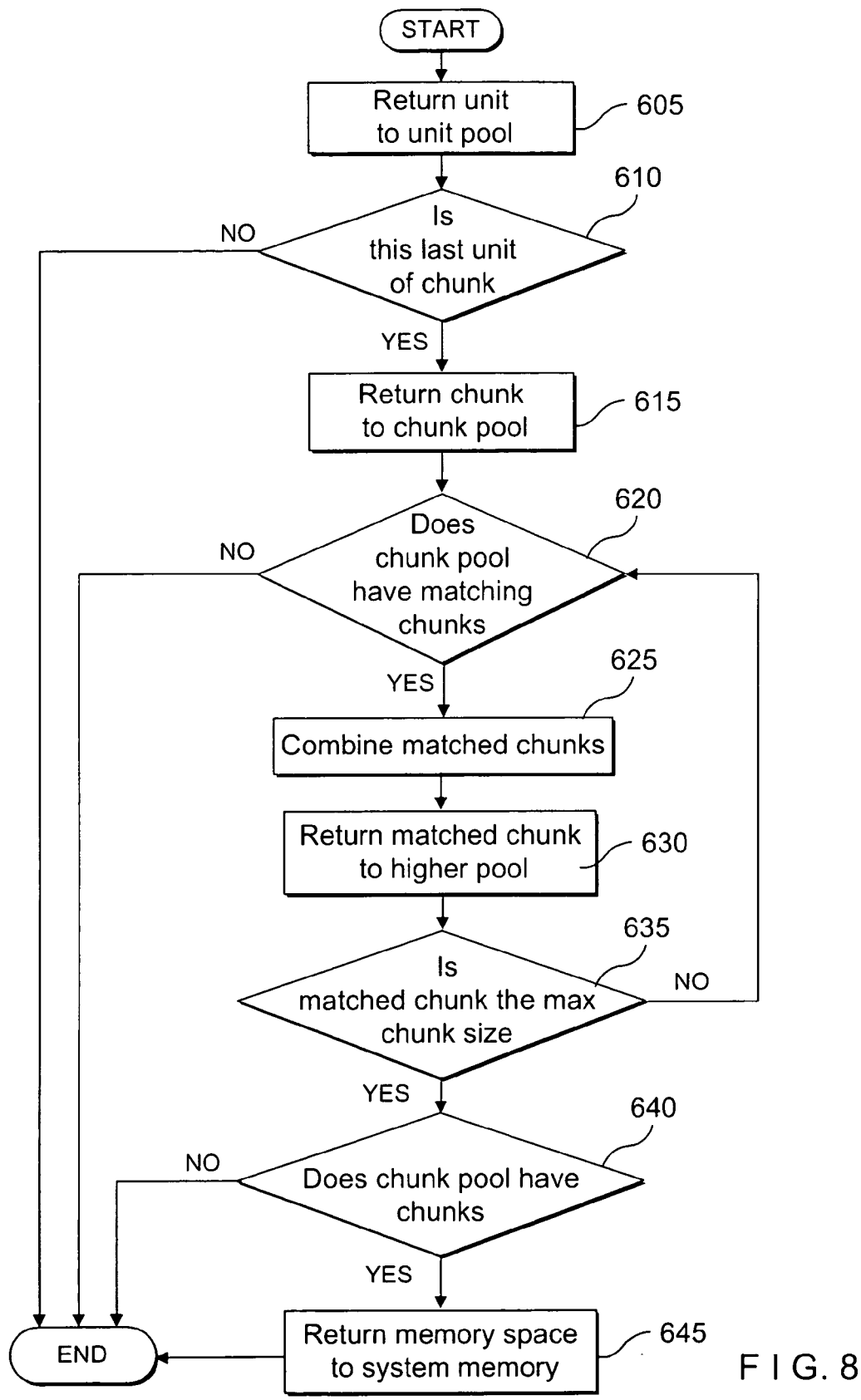
FIG. 8 shows an exemplary process for combining unused chunks according to the present invention.

FIG. 8 shows an exemplary process for combining unused chunks which is essentially a mirror operation to the exemplary process described with respect to FIG. 7. The purpose of this exemplary process is to return memory space to the system memory when the memory manager no longer requires the space. As described above, during system operation data that is stored in unit pools may no longer be needed and it may be erased from a unit pool. In some cases, all the units of a chunk will be empty because of this erasing and there will be allocated memory space that is not being used. Therefore, to the extent possible, this memory area should be returned to the system memory or reallocated within the memory manager to more effectively handle the storage of data. In step 605 a unit is returned to a unit pool, which means that the data stored in the unit has been erased and the unit is available to store new data. In step, 610 it is determined whether the returned unit was the last unit of the chunk. If it is not the last unit of the chunk, i.e., active data still is being stored in other units of the chunk, the process ends. If, the returned unit is the last unit of the chunk, the process continues to step 615 where the chunk is returned to the chunk pool.

The process then continues to step 620 to determine if the newly returned chunk has a matching chunk in the chunk pool. The criteria for finding a match includes that the chunks are compatible, that is, the combination of the two chunks form a continuous memory space in the system memory of one of the predefined chunk sizes. If there is no match, the process ends. If a match is found, the process continues to step 625 where the two matched chunks are combined into a larger matched chunk. The process then goes to step 630 where the newly combined matched chunk is returned to the next highest chunk pool. The process then continues to step 635 where it is determined whether the newly combined matched chunk created in step 625 is a chunk of the maximum size. If it is not, the process loops back to step 620 to determine whether the newly combined matched chunk has a matching chunk in the higher chunk pool and the process continues as was described above. If in step 635, the newly combined matched chunk is of the maximum chunk size, the process continues to step 640 where it is determined whether the chunk pool has any additional chunks. If there are no additional chunks, the process ends to avoid "ping-ponging" with system memory. However, if it is not the only chunk in the chunk pool, the process continues to step 645 where a chunk having the maximum predefined size is returned to the system memory for its use.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A method, comprising the steps of:
   defining a first memory chunk of system memory, the first memory chunk being a continuous memory space of a first predetermined size;
   dividing the first memory chunk into a second memory chunk and a third memory chunk;
   assigning control of the second and third memory chunks to a chunk pool;
   transferring control of the second memory chunk from the chunk pool to a unit pool;
   separating the second memory chunk into units of a second predetermined size; and
   storing data of the second predetermined size in the units.

2. The method of claim 1, further comprising the steps of:
   transferring control of the third memory chunk to a second chunk pool; and
   dividing the third memory chunk into a fourth memory chunk and a fifth memory chunk.

3. The method of claim 1, further comprising the step of:
   re-combining the second memory chunk and the third memory chunk to form the first memory chunk.

4. The method of claim 1, wherein the second and third memory chunks are each one-half the first predetermined size.

5. The method of claim 4, wherein the first predetermined size is one of 1,024 bytes, 2,048 bytes, 4,096 bytes, 8,192 bytes, 16,384 bytes and 32,768 bytes.

6. The method of claim 1, further comprising the steps of:
   transferring control of the third memory chunk from the chunk pool to a second unit pool;
   separating the third memory chunk into units of a third predetermined size, the third predetermined size being different from the second predetermined size; and
   storing data of the third predetermined size in the units of the third predetermined size.

7. A system, comprising:
   a first chunk of system memory, the first chunk being a continuous memory space of a first predetermined size;
   a plurality of chunk pools, each chunk pool assigned to manage chunks of a predetermined size; and
   a plurality of unit pools, each unit pool assigned to manage memory units of a unit size, wherein the first chunk is divided into a plurality of chunks, each of the plurality of chunks being assigned to the corresponding chunk pool and wherein one of the chunk pools transfers control of one of the chunks to one of the unit pools which divides the chunk into the memory units of the unit size, the corresponding unit pool storing data of the unit size in the units.

8. The system of claim 7, wherein the system memory is one of static random access memory, dynamic random access memory, synchronous dynamic random access memory and enhanced dynamic random access memory.

9. The system of claim 7, wherein the one of the unit pools recombines the memory units into the chunk and passes control of the chunk back to the corresponding chunk pool.

10. The system of claim 7, wherein, when the memory units are full, the one of the unit pools requests the one of the chunk pools to transfer control of a second chunk to the one of the unit pools to divide the second chunk into additional memory units.

11. The system of claim 7, wherein the first chunk of system memory is used exclusively for data to be stored by the unit pools.

12. The system of claim 7, wherein the first chunk of system memory is assigned during system initialization.

13. The system of claim 7, wherein the chunk pools include a hierarchical relationship where chunk pools receive chunks from a next highest chunk pool in the hierarchy.

14. The system of claim 13, wherein chunk pools return unused chunks to the next highest chunk pool in the hierarchy when a stun of the returned chunks equals the predetermined size of chunk controlled by the next highest chunk pool.

\* \* \* \* \*